United States Patent [19]
Thiel

[11] 3,855,674
[45] Dec. 24, 1974

[54] AUTOMATIC SEPARABLE FASTENER
[76] Inventor: Ralph Thiel, 1129 Wanda Ave., Seaside, Calif. 93955
[22] Filed: July 26, 1973
[21] Appl. No.: 382,917

[52] U.S. Cl. .............................. 24/230 A, 24/211 R
[51] Int. Cl............................................. A44b 11/25
[58] Field of Search ....................... 24/230 A, 211 R

[56] References Cited
UNITED STATES PATENTS
| 3,152,377 | 10/1964 | Carter | 24/211 R |
| 3,451,720 | 6/1969 | Makinen | 24/230 A |
| 3,606,456 | 9/1971 | Cazabon | 24/230 A |

FOREIGN PATENTS OR APPLICATIONS
| 690,896 | 4/1953 | Great Britain | 24/230 A |

Primary Examiner—Bernard A. Gelak

[57] ABSTRACT

A shock detector member associated with one buckle member of a seat belt arrangement and triggered mechanism released thereby for camming the latch bolt of the other buckle member out of locked engagement. A time delay means operatively associated with the triggered mechanism for retarding sudden release of such latch bolt from locked engagement. Means for blocking the released triggered mechanism against movement at the option of the person wearing the seat belt.

10 Claims, 15 Drawing Figures

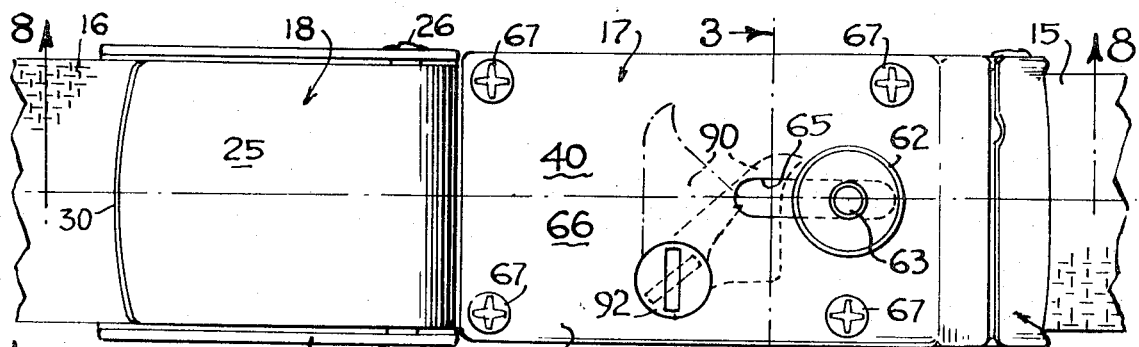
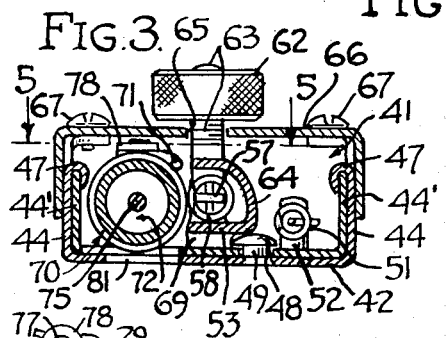
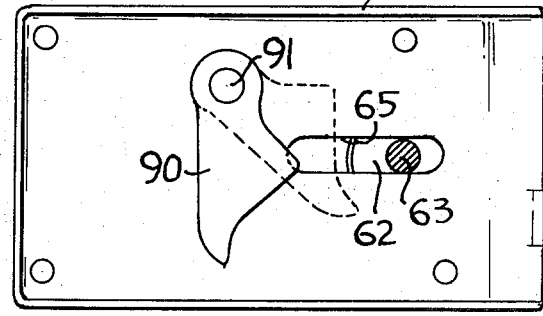
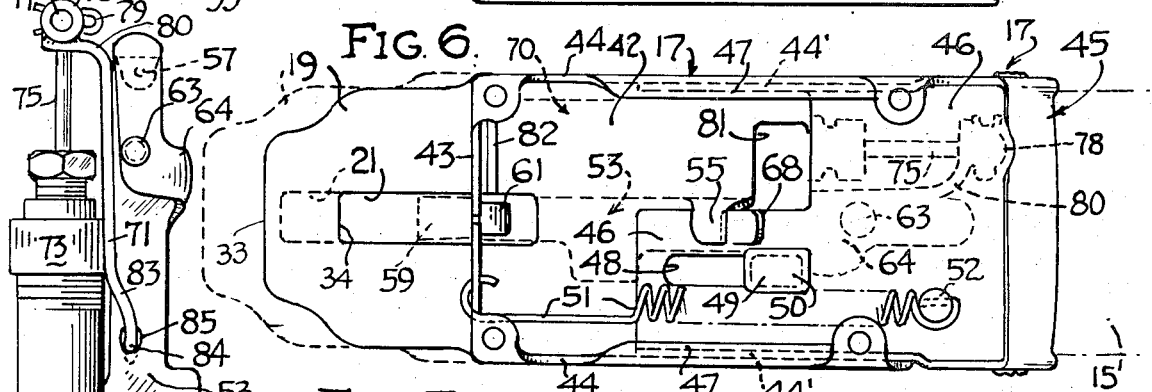
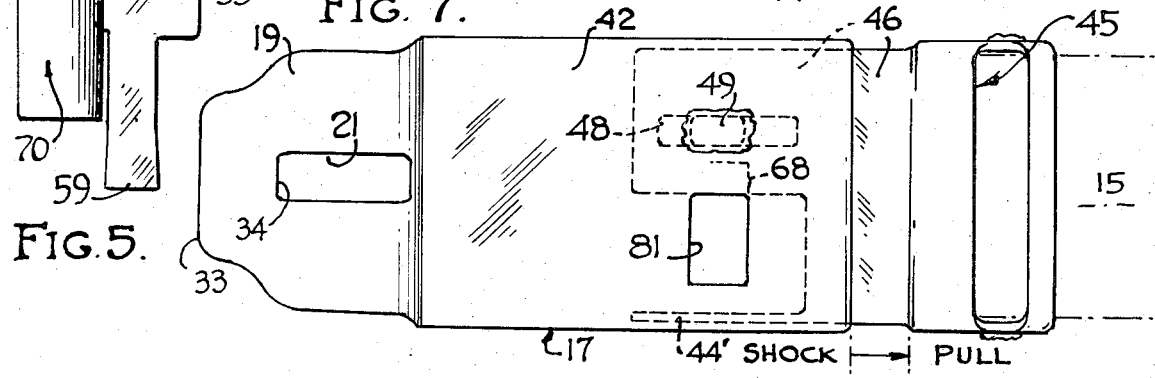

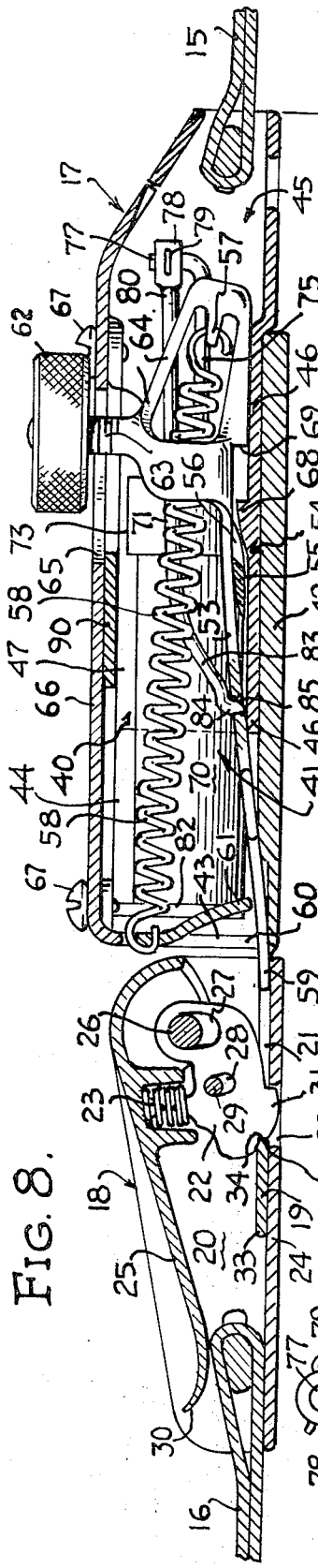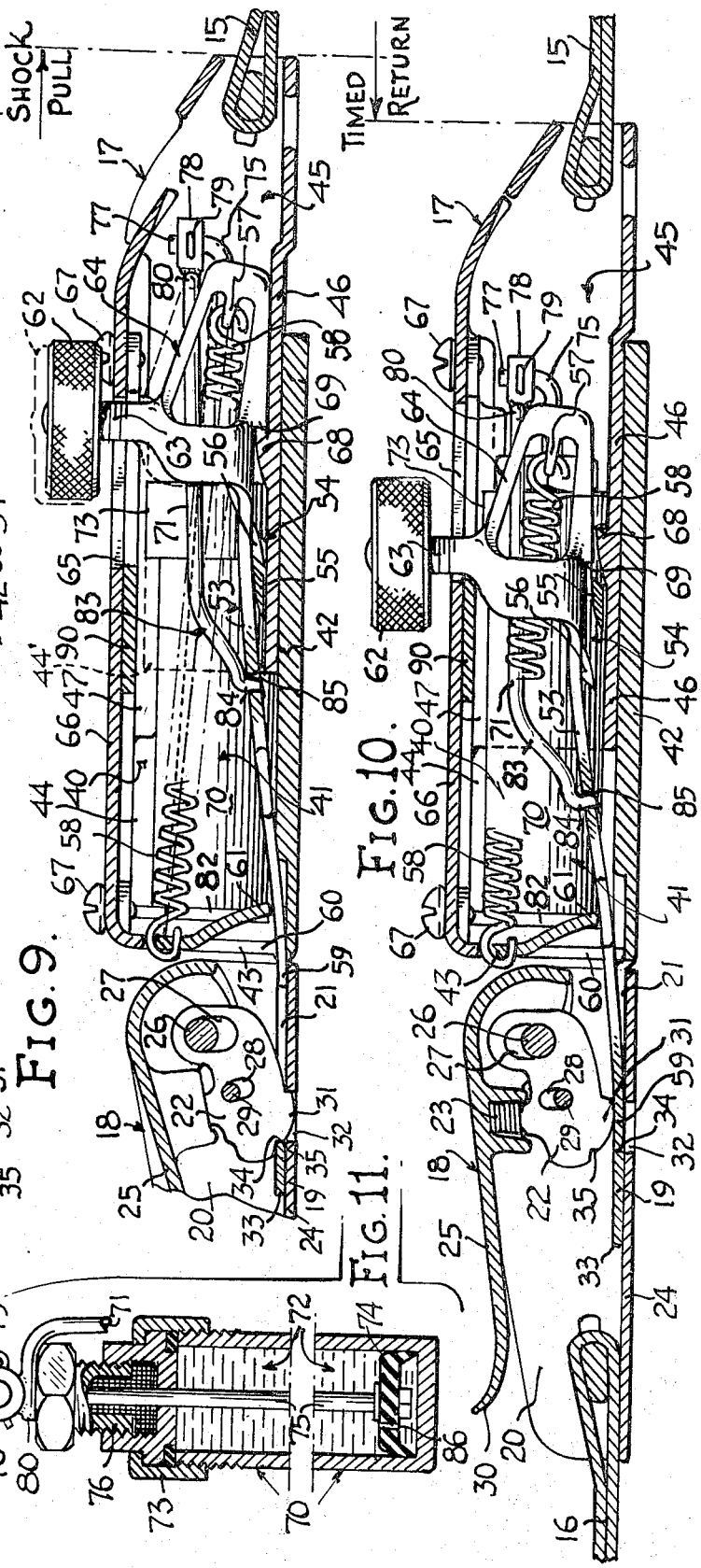

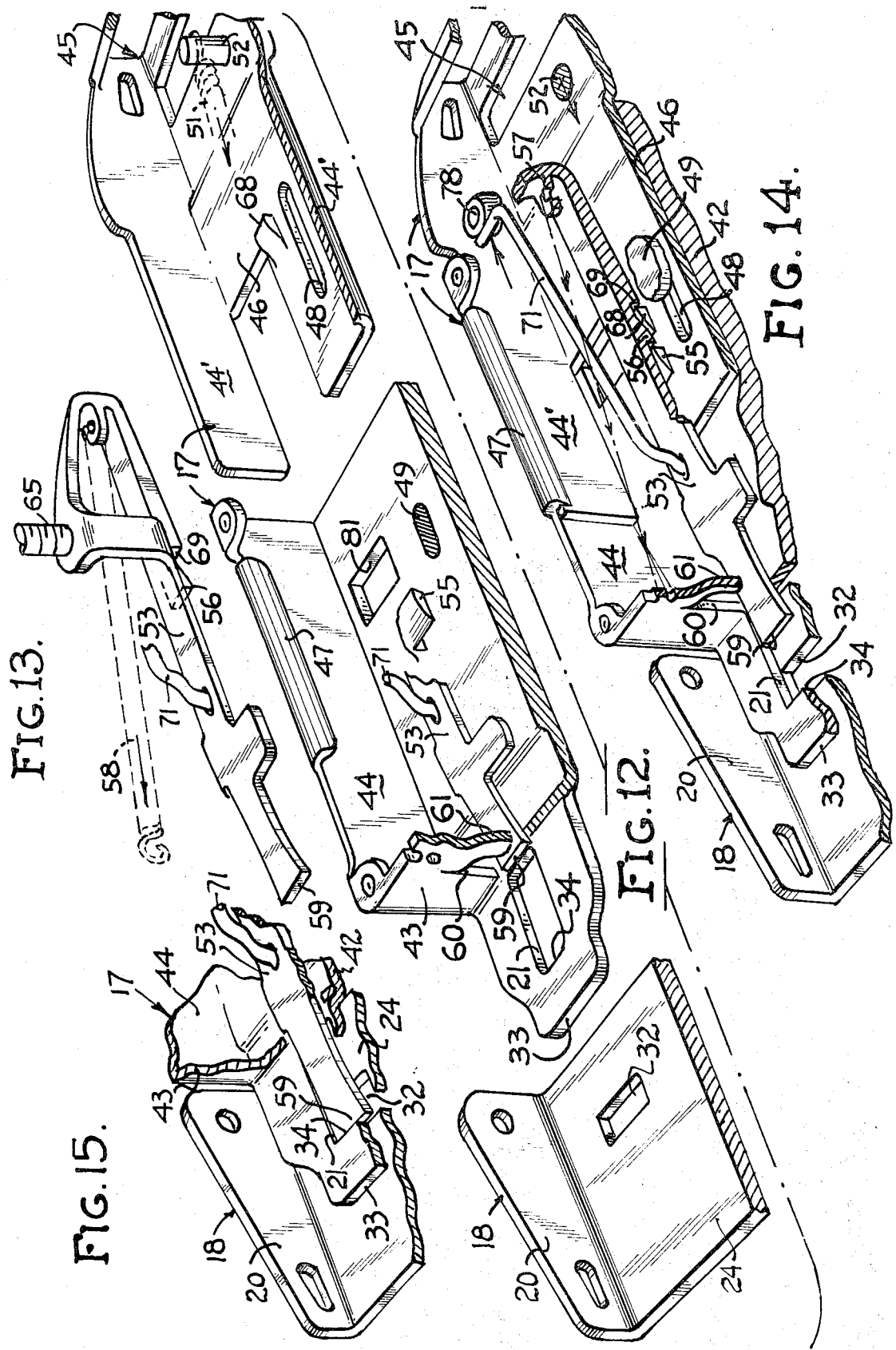

3,855,674

AUTOMATIC SEPARABLE FASTENER

BACKGROUND

This invention relates to safety belts for vehicles and more particularly to an automatic delayed release therefore.

Safety belts also well known as seat belts are in common usage on airplanes, automobiles and other forms of vehicular transportation. Conventional seat belts consist of a pair of straps having ends anchored to the floor or chassis of the vehicle and opposite ends provided with male and female buckle members adapted to be latched together. The latch portion of one of the buckle members has a thumb release member whereby the passenger using the seat belt may release the latched engagement of the buckle members at will.

The main purpose of seat belts is to maintain the passenger firmly positioned in the seat to avoid or prevent his body from becoming unseated upon impact or in case of the shock created in an accident. After such accident when the vehicle comes to rest, regardless of its position, overturned, on its side or what have you, the passenger should be released for removal from the vehicle. This is simple enough if the passenger has presence of mind and is able to coordinate. However, in cases of severe shock, momentary disability or even the unconscious condition of the passenger, he will be secured in the seat by the locked seat belt. In many cases the mangled condition of the vehicle prevents anyone outside thereof from gaining access to release the buckle. This may be especially difficult in case of a fire breaking out or the vehicle in flames.

The present invention seeks to overcome the difficulty arising due to a locked seat belt by the provision of an automatic release of a locked buckle within a predetermined lapse of time following the shock created at impact of an accident.

STATEMENT OF INVENTION

It is an object of this invention to provide in seat belt buckles a pre-set shock detecting member adapted to become unset upon an excessive shock pull and a timed release for the latch buckle for effecting unlocking of such seat belt buckle.

It is another object to provide in combination with one buckle member a spring loaded release bar and a trip mechanism for cocking the same in readiness for release upon triggering thereof by a shock pull detecting device embodied in the seat belts of a vehicle.

It is yet another object to provide in such an arrangement means for retarding sudden return of the spring loaded release bar to its unset condition in which it can release the latch buckle of the seat belt arrangement.

These and other objects and advantages of the present invention will become apparent in the following description when read in the light of the accompanying three sheets of drawing in which:

FIG. 1 is a front elevational view of a safety belt buckle having the timed release latching means of the present invention embodied therein;

FIG. 2 is a side elevation of FIG. 1;

FIG. 3 is a cross section through FIG. 1 taken substantially along and as seen from line 3—3 therein;

FIG. 4 is a bottom plan view of the cover only removed from FIG. 1;

FIG. 5 is a plan view of a dashpot and latch bolt embodied in the present invention as seen from line 5—5 and removed from the assembly of FIG. 3;

FIG. 6 is a front plan view of the timed release means of the present invention of FIG. 1 with the cover of FIG. 4 as well as the dashpot and latch bolt of FIG. 5 removed for purpose of illustration;

FIG. 7 is a back elevation view of the timed release means of FIG. 6 with parts extended during a shock unlatching pull;

FIG. 8 is a longitudinal section through FIG. 1 taken substantially along line 8-8 thereof and at a larger scale with respect thereto for purpose of clarity;

FIG. 9 is a section similar to and of a portion of FIG. 8 with parts disposed as in the shock, unlatching pull of FIG. 7;

FIG. 10 is a section similar to that of FIGS. 8 and 9 with the parts returned and latch released for disconnecting the buckle;

FIG. 11 is an enlarged sectional detail through the dashpot of FIG. 5 effecting timed return of the parts and automatic opening of the buckle.

FIG. 12 is an exploded perspective view of three of the principal parts of the latch release mechanism of the invention, sidewalls thereof being broken away for purpose of clearly and illustration;

FIG. 13 is a perspective view of the spring loaded and time delay retarded slide bar FIG. 14 is an assembly of the principal parts of FIGS. 12 and 13 in position of sectional view FIG. 9; and FIG. 15 is an fragmentary perspective view of the hand releaseable part of the belt with the slide bar disposed thereon to automatically release the latch belt as in the sectional view of FIG. 10.

GENERAL DESCRIPTION

In the drawings a pair of seat belts 15-16 have their meeting ends secured to buckle members 17 and 18, respectively, for latched engagement with each other. The opposite ends of the belts 15 and 16 are secured to the chassis of the vehicle and may be of the type set on a reel for change of length in a conventional manner.

The buckle members 17 and 18 have parts consisting of the usual form to establish a latched connection therebetween. The most common parts of such buckle members consist of a flat plate 19 on one buckle member 17 extending from one of the belts 15 for sliding fit into a U shaped frame 20 formed as a part of the other buckle member 18. The flat plate 19 has an open slot 21 formed therein adapted to receive a latch bolt 22 arranged in the frame 20 of the buckle member 18 (see FIGS. 8, 9 and 10). The bolt 22 is a one way bolt urged by a spring 23 toward the bight portion 24 of the U shaped frame 20. The spring 23 is mounted in a lever handle 25 hinged on a cross shaft 26 between the side flanges of the U shaped frame 20. The bolt 22 has slotted connection as at 27 with the shaft 26 as well as at 28 with a cross pin 29 on the lever handle 25 whereby the bolt can be released manually by lifting of the finger engaging end 30 of the lever handle 25.

The keeper part of the bolt 22 is a segmental detent 31 which extends down through a slot 32 formed in the bight portion 24 of the frame 20. The arrangement is such that when the flat plate 19 of the buckle member 17 is inserted parallel to the bight portion 24 of the frame 20, the bolt 22 is swung out of the way against the action of the spring 23. Thus, the fore end 33 of the flat plate 19 passes beyond the bolt 22 until the detent 31 of the latter is forced by spring 23 through the slot 21 in the plate 19 and into the slot 32 in the bight portion of the frame 20. The plate 19 thus becomes latched to the bolt 22 by reason of the back edge 34 of the fore end 33 of plate 19 abutting a notch 35 on the fore end of the detent 31 of the bolt 22. The buckle members 17 and 18 thus related become locked together and under normal conditions could heretofore only be released by manual lifting of the lever handle 25 in the usual manner.

DETAILED DESCRIPTION

In accordance with the present invention a timed delay release mechanism 40 is provided on the buckle member 17 having the flat plate 19 thereof associated therewith. For purposes of explanation of the present invention, the buckle member 18 will be considered the manually released buckle member as distinguished from the timed delay release mechanism 40 forming a part of the other buckle member 17.

The mechanism 40 comprises a housing 41 having a bottom 42 from which the flat plate 19 extends as an integral part. The housing 41 has an upstanding fore wall 43 and side walls 44—44 and an open back end into which a shock detecting pull member 45 fits. This shock detecting pull member 45 has the usual belt snubbing connection with the seat belt 15 which extends from a tapered aft end of the member 45.

The shock detecting pull member 45 has sliding fit into the open after end of the housing 41. For this reason the member 45 is U shaped in a crosswise direction and has a bottom 46 which slides parallel to the bottom 42 of the housing 41 and side flanges 44'—44' which slide parallel to and fit within the side walls 44 and 44 of the housing 41. Each side wall 44 and 44 has a portion of its upper edge curled inwardly and downwardly to form an inverted U shaped guide 47 over the top edge of the respective side flanges 44' and 44' of the shock detecting pull member 45 (FIGS. 3 and 6). In addition to the guides 47, the bottom 46 of the pull member 45 has a slot 48 formed therethrough which rides over a stud pin 49 secured to the bottom 42 of the housing 41. The stud pin 49 has an enlarged head 50 which overlays mushroom fashion the upper surface of the pull member bottom 46 around the slot 48 therein.

The entire shock detecting pull member 45 is pulled forwardly into the housing 41 by a pull resisting tension spring 51. The spring 51 has one end secured to a post 52 extending upwardly from the bottom 46 to which it is secured and the opposite end of spring 51 is attached to the forward wall 43 of the housing 41. As best seen in FIG. 6 the slot 48 is elongated in a fore to aft direction and serves with the pin 49 to limit the movement of the member 45 in such direction. Under normal conditions, the spring 51 maintains the member 45 in contracted condition relative to the housing 41. Only as a result of an excessive pull or tug on the belt 15 is the member 45 extended or pulled outwardly the housing 41 against the action of the pull resisting spring 51. The reasons for this reaction will be made clear following further detailed description of the timed delay release mechanism 40.

The means for automatically releasing the manually operated buckle member 18 comprises a spring loaded slide bar 53 (FIG. 5) having a trip mechanism 54 operatively associated with the shock detecting pull member 45, heretofore explained.

As best seen in FIG. 6, the slide bar 53 as depicted in dotted lines is disposed to lie substantially midway between the side walls 44—44 of the housing. It will also be noted that a trip abutment 55 extends up from the bottom 42 of the housing 41 and overlies the bottom 46 of the shock detecting pull member 45. This trip abutment 55 has an inwardly beveled edge into which a hounds tooth projection 56 on the slide bar 53 is adapted to engate (FIGS. 8 and 14). The slide bar 53 has an aft end provided with a spring attaching ear 57 for receiving one end of a tension spring 58 serving as a release spring for the trip mechanism 54. The release spring 58 has its opposite end anchored to the notched top edge of the fore wall 43 of the housing 41 at a higher level than the ear 57 on the slide bar 53 when the hounds tooth projection 56 of the latter is engaged behind the trip abutment 55. This cocks the spring loaded slide bar 53 for future operation upon triggering, i.e., upsetting of the trip mechanism 54.

The fore end 59 of the slide bar 53 extends forwardly through an opening 60 formed through the fore wall 43 of the housing 41. The opening 60 is formed by punching in a portion 61 of the wall 43 so as to overlie that portion of the slide bar passing through the opening 60. This maintains the fore end 59 of the slide bar in the slot 21 formed through the plate 19 which extends forwardly from the housing 41 and into latched engagement with the manually released buckle 18 of the seat belt arrangement.

In cocked condition of the slide bar 53 as seen in FIG. 8, the fore end 59 thereof is disposed just ahead of the fore wall 43, within the slot 21 of the plate 19 which is latched by the bolt 22 to the manually released buckle member 18. The slide bar 53 is adjusted into this cocked condition manually by means of a knob 62 threaded upon a screw shank 63 which extends upwardly from a bridgework 64 formed on the slide bar 53 and braced by the aft end of the latter where the spring attaching ear 57 is provided. The screw shank 63 extends upwardly out of the housing 41 and through a slot 65 formed through a cover 66 for the housing 41. The cover 66 is secured to the upper edges of the fore and side walls 43-44-44 by means of top screws 67. The cover 66 thus serves to limit upward movement of the slide bar 53 by action of the release spring 58 upon triggering thereof trip mechanism 54.

Assuming the buckle members attached and the slide bar 53 cocked as in FIG. 8, the trip mechanism 54 is triggered by any sudden shock such as the impact of an accident creating a pull on the belt 15 connected to the shock detecting pull member 45. Such shock exerts a pull against the action of the pull resisting spring 51 which is calculated to yield against a pull of, say 15 pounds and over. By such tug or pull on the belt 15, the shock detecting pull member 45 is withdrawn to the right as illustrated in FIG. 9. The bottom 46 of the pull member 45 has an upturned detent 68 normally disposed just back of the hounds tooth 56 projecting downwardly from the slide bar 53 as seen in FIGS. 8 and 14. This detent 68 on the pull member 45 is disposed to engage a shoulder 69 formed on the lower surface of the slide bar 53 as a part of the bridgework 64 on the after end thereof. By this arrangement the slide bar 53 is caused to be withdrawn rearwardly by the member 45 as it is withdrawn from the housing 41 as shown in FIG. 9. The hounds tooth detent 56 on the slide bar 53 is thus disengaged from the inwardly beveled edge of the trip abutment 55 on the bottom 42 of the housing 41. By reason of the angular disposition of the release spring 58 connected to the slide bar 53, the aft end of the latter is caused to elevate from the lower position toward dotted line position FIG. 9. This raises the hounds tooth detent 56 above the abutment 55 such that the entire slide bar 53 is now free to be drawn forwardly by the release spring 58. Ordinarily this would be a sudden forward thrust of the slide bar 53 whereby the fore end 59 of the latter in the slot 21 would pass over the slot 32 in member 17 (FIG. 15) into a position beneath the bolt 22 as seen in FIG. 10. Thus the bolt would be raised against the action of its presser spring 23 out of in the slot 21 or latched engagement with the flat plate 19 and the safety belts released. Such sudden release of the seat belt buckles at the moment of impact may defeat the purpose of such safety belts, i.e., to maintain the passenger firmly seated during impact. Consequently, the present invention contemplates a time delay of such release.

Means for retarding sudden release of the slide bar 53 under the influence of the release spring 58 comprises a dashpot 70 and a connecting rod 71 for operatively connecting the latter to the slide bar 53 (FIG. 5).

Referring to FIG. 11 the dashpot 70 consists of a cylinder 72 closed at one end and capped as at 73 at the other end to confine a quantity of fluid. For best results a fluid consisting of oil is preferred although it is conceivable that air confined within the closed cylinder 72 may be acceptable. Within the cylinder 72 is a piston 74 secured to one end of a piston rod 75 which passes through a suitable packing gland 76 in the cap 73. The outer end of the piston rod 75 is provided with a binding post 77 upon which a boss collar 78 is mounted for slight rotative movement. The collar 78 is maintained on the binding post 77 by a suitable spring clip 79 to allow for articulation of the collar 78 relative to the post 77.

One end 80 of the connecting rod 71 is welded or otherwise formed integrally upon the collar 78 so as to cause the rod 71 to move with the piston rod 75. As best seen in FIG. 3 the dashpot 70 is disposed in the housing 41 with its cap 73 lodged in a slot or opening 81 (FIGS. 6 and 7) formed in the bottom 42 of the housing. The closed end of the dashpot cylinder 72 abuts a skirt 82 formed in the housing 41 adjacent its fore end so that the assembly as shown in FIG. 5 turned 90° clockwise lies in a position as shown in dotted lines in FIG. 6. The connecting rod 71 thus disposed is offset relative to the dashpot 70 and has its free end 83 bowed downwardly in a sinus curve and terminating in a right angle stud 84 engaged in a bore 85 formed in the slide bar 53.

By the foregoing arrangement the connecting rod 71 is caused to move rearwardly with the slide bar 53. Thus the piston rod 75 of the dashpot 70 is pulled outwardly from the cylinder 72 during cocking of the slide bar 53 upon manual movement of the knob 62 on the screw shank 63 of the slide bar 53. It should here be noted that the piston 74 is cupped such as to allow the fluid within the cylinder 72 to bypass its periphery during cocking of the trip mechanism 54. However, the force of the release spring 58 in returning the piston to the opposite end of the cylinder is resisted due to limitation of the flow of fluid only through a small orifice 86 formed through the piston 74. The size of the orifice 86 determines the time lapse afforded in delaying the movement of the slide bar 53 under the influence of its release spring 58. It is contemplated that a time lapse of from 20 to 30 seconds following a shock pull upon the belt 15 would be satisfactory. This could be varied as desired to give a longer lapse as desired.

With the foregoing in mind it will be noted that upon triggering of the trip mechanism 54 by a sudden shock pull by belt 15 upon the shock detecting pull member 45, the hounds tooth 56 of the slide bar 53 is released from the abutment 55 in the housing 41. The release spring 58 then raises the aft end of the slide bar 53 while the pull member 45 returns to normal retracted condition into the housing 41 by the pull resisting spring 51. Thereafter the release spring 58 contracts and pulls the slide bar 53 forwardly and by reason of the latters connection with the dashpot 70 via connecting rod 71 sudden movement of the slide bar is retarded. The slide bar 53 thereby moves slowly toward the left from the position in FIG. 9 to that shown in FIG. 10 in a matter of 20 to 30 seconds dependent upon the size of the orifice 86 in the piston 74. Ulimately the fore end 59 of the slide bar 53 cammingly engages the latch bolt 22 and raises the latter against the action of its presser spring 23 to disengage its segmental detent 31 out of engagement with the back edge 34 of the fore end 33 of the plate 19. The latching lever handle 25 is thus raised automatically (FIG. 10) and the buckle members 17 and 18 released from each other.

In the event a person using the seat belt arrangement of the present invention wishes to render the shock release mechanism thereof inoperative a cancelling device is provided in the form of a dog-leg lever 90 FIGS. 1 and 4 on the underside of the cover 66. The dog-leg lever is secured to a screw shank 91 which extends through the cover for pivotally connecting the lever 90 thereto. The shank 91 has a slotted head 92 to facilitate swinging movement of the dog-leg lever between full to dotted line position FIG. 4. In the dotted line position FIG. 4 the lever 90 has a portion thereof disposed across the slot 65 in the cover 66 to block movement of the screw shank 63 of the slide bar 53 from returning toward full forward position. This stops forward movement of the fore end 59 of slide bar 53 short of engagement with the latch bolt 22 whereby the latter will remain in latched condition until manually released by manual operation of the lever handle 25 on the buckle 18.

Having thus described the automatic release mechanism for seat belt buckles in specific detail it will be appreciated by those skilled in the art that the same may be susceptible to alterations, variations and/or modifications without departing from the spirit or scope of my invention therein as set forth in the annexed claims.

What I claim as new and desire to protect by Letters Patent is:

1. The combination with the buckles of a seat belt arrangement in which a manually releasable buckle member has a spring loaded latch bolt adapted for locking engagement in an opening formed in a flat plate of the other buckle member upon insertion of such plate into the manually releaseable buckle, of means for automatically unlocking the buckle members following an excessive shock pull upon such seat belt arrangement comprising:

1. a housing having a bottom with a fore end formed contiguous to the flat plate of such other buckle member for extension of the plate into the manually releasable buckle member;
2. a spring loaded shock detecting pull member arranged for sliding guided movement in said housing and projecting from the aft end thereof for connection to a seat belt;
3. a spring loaded slide bar arranged for sliding movement in said housing and having a bolt engaging and camming end arranged within the opening formed in the flat plate fore end of said housing normally urged toward the bolt for lifting the bolt out of locking engagement with the flat plate fore end of said housing;
4. slide bar cocking means between said housing and said spring loaded slide bar for cocking the latter in retracted condition with its bolt engaging end withdrawn from beneath the bolt of the manually releasable buckle member for automatically releasing the same from the flat plate other than manually; and
5. a trip mechanism between said spring loaded slide bar and said shock detecting pull member for triggering said slide bar cocking means upon the exertion of an excessive pull upon said shock detecting pull member for releasing said spring loaded slide bar and the fore end thereof for movement toward and into engagement with the bolt of the manually releasable buckle member for releasing the same.

2. The means for automatically unlocking locked seat belt buckle members in accordance with claim 1 including a timed delay means in said housing operatively connected to said spring loaded slide bar for retarding movement of the latter and its bolt engaging end toward the bolt for a predetermined lapse of time following an excessive shock pull upon said shock pull detecting member.

3. The means for automatically unlocking locked seat belt buckles in accordance with claim 1 in which said slide bar cocking means comprises:

1. a cover for said housing having an elongated slot formed in a fore to aft direction therethrough in the region of said spring loaded slide bar; and
2. a screw shank formed integrally with said spring loaded slide bar and extending through the slot formed in said cover for facilitating manual retraction of said slide bar into cocked condition.

4. The means for automatically unlocking locked seat belt buckle members in accordance with claim 3 including a timed delay means in said housing operatively connected to said spring loaded slide bar for retarding movement of the latter and its bolt engaging end toward the bolt for a predetermined lapse of time following an excessive shock pull upon said shock pull detecting member.

5. The means for automatically unlocking locked seat belt buckles in accordance with claim 4 in which said slide bar cocking means comprises:

1. a trip abutment extending upwardly from the bottom of said housing having a downwardly angled beveled after edge;
2. a hounds tooth projection on the underside of said spring loaded slide bar adapted to engage behind the beveled after edge of said trip abutment upon manual retraction of said spring loaded slide bar and the forward pull of the spring of the latter; and 3. means on said shock detecting pull member adapted to engage said spring loaded slide bar during a shock pull for unseating said hounds tooth projection from cocked engagement with said trip abutment.

6. The means for automatically unlocking locked seat belt buckles in accordance with claim 5 including:

1. a tension type release spring for spring loading said slide bar and having one end anchored to said housing adjacent the fore edge of said cover;
2. a spring attaching ear on the after end of said slide bar having the opposite end of said tension type release spring secured thereto, said attaching ear being disposed at a lower level than the anchored fore end of said release spring when said hounds tooth projection on the slide bar is in cocked relation with said trip abutment in said housing; and
3. an upwardly inclined detent on the shock detecting pull member to the rear of said hounds tooth projection when it is seated behind said trip abutment, and adapted to cammingly lift the after end of said slide bar upon unseating of said hounds tooth projection from behind said trip abutment for passage over the latter under the influence of said tension type release spring.

7. The means for automatically unlocking locked seat belt buckles in accordance with claim 6 in which said trip mechanism between said spring loaded slide bar and said shock detecting pull member includes a shoulder formed on the underside of said slide bar engageable by said upwardly inclined detent on said shock detecting pull member for momentarily retracting said hounds tooth from behind said trip abutment during an excessive shock pull upon said belt arrangement.

8. The means for automatically unlocking locked seat belts in accordance with claim 7 in which said screw shank is formed on a bridgework integrally of and above the aft end of said spring loaded slide bar for engaging the underside of said cover to thereby limit upward movement of the aft end of the slide bar under the influence of its release spring and during return thereby toward bolt engaging condition.

9. In the device for automatically unlocking locked seat belts in accordance with claim 8, means for cancelling operation thereof at the option of the person wearing the same comprising:

1. a dog-leg lever pivotally mounted on the underside of said cover;
2. a screw shank secured to said dog-leg lever extending upwardly through said cover; and
3. means on the upper, outer end of said screw shank above said cover facilitating manual swinging of said dog-leg lever to a position wherein a portion thereof traverses the slot formed in said cover for obstructing movement of said screw shank formed on said slide bar and for maintaining the latter in cocked condition.

10. The means for automatically unlocking locked seat belt buckles as in claim 4 in which said timed delay means comprises:

1. a dashpot arranged in said housing in parallel relation to the fore and aft movement of said spring loaded slide bar;

2. said dashpot including:
   a. a cylinder closed at one end disposed forwardly within said housing;
   b. a piston within said cylinder provided with an orifice of a predetermined size to retard return movement thereof toward its forward position within said cylinder for a predetermined lapse of time;
   c. a piston rod having one end connected to said piston within said cylinder and its opposite end extending rearwardly therefrom;
   d. a packing gland and cap secured to the after end of said cylinder for passage of the after end portion of said piston rod therethrough; and 3. a connecting rod having one end provided with a collar mounted on the after end of said piston rod and its opposite end extending forwardly therefrom in substantially parallel relation to said spring loaded slide bar and having a sinus curve terminating in a right angle stud extending through said slide bar for movement therewith into cocked condition for drawing said piston toward the cap end of said cylinder and for retarding the return action of the spring loaded slide bar for a lapse of time dependent upon the size of the orifice formed in the piston of said dashpot.

* * * * *